(12) United States Patent
Bossel

(10) Patent No.: US 6,316,133 B1
(45) Date of Patent: Nov. 13, 2001

(54) DEVICE FOR CONVERTING ENERGY USING FUEL CELLS WITH INTEGRATED HYDROGEN GAS PRODUCTION

(75) Inventor: Ulf G. Bossel, Oberrohrdorf (CH)

(73) Assignee: DCH Technology, Inc., Valencia, CA (US)

( * ) Notice: Subject to any disclaimer, the term of this patent is extended or adjusted under 35 U.S.C. 154(b) by 0 days.

(21) Appl. No.: 09/367,674

(22) PCT Filed: Dec. 16, 1998

(86) PCT No.: PCT/CH98/00539

§ 371 Date: Dec. 29, 1999

§ 102(e) Date: Dec. 29, 1999

(87) PCT Pub. No.: WO99/33133

PCT Pub. Date: Jul. 1, 1999

(30) Foreign Application Priority Data

Dec. 18, 1997 (CH) .................................................. 2921/97

(51) Int. Cl.[7] .............................. H01M 8/04; H01M 8/06
(52) U.S. Cl. .................................. 429/17; 429/19; 429/20; 429/37
(58) Field of Search .................................. 429/37, 66, 101, 429/19, 20, 17

(56) References Cited

U.S. PATENT DOCUMENTS

| | | | |
|---|---|---|---|
| 3,061,658 | * | 10/1962 | Blackmer . |
| 3,098,768 | * | 7/1963 | Titterington et al. . |
| 4,261,956 | * | 4/1981 | Adlhart ................................. 422/239 |
| 5,002,842 | * | 3/1991 | Pugusi et al. ...................... 429/101 X |
| 5,202,195 | * | 4/1993 | Stedman et al. ......................... 429/17 |
| 5,372,617 | * | 12/1994 | Kerrebrock et al. ...................... 48/61 |
| 5,484,666 | * | 1/1996 | Gibb et al. ............................... 429/34 |
| 5,514,353 | * | 5/1996 | Adlhart ................................. 422/239 |

FOREIGN PATENT DOCUMENTS

| | | | |
|---|---|---|---|
| 813264 | * | 12/1997 | (EP) . |
| 1581350 | * | 9/1969 | (FR) . |
| 92-66002 | * | 10/1997 | (JP) . |
| 98-35398 | * | 8/1998 | (WO) . |
| 99/33133 | * | 7/1999 | (WO) . |

OTHER PUBLICATIONS

*Chemical Abstracts* vol. 110, No. 41982 e, Ward et al, Feb. 1989.*

Adlhart et al "An Assessment of The Air–Breathing, Hydrogen Fueled Spe Fuel Cell", Proceedings Of The 28th Power Sources Conferences Symposium, pp. 29–32, Jun. 1978.*

"Metal Hydride/Air Batteries" Manufacturing Technology Note US Army Materiel Development and Readiness Command, Mar. 1979.*

* cited by examiner

Primary Examiner—Stephen Kalafut

(57) ABSTRACT

A device for converting energy by a proton-conducting electrolyte, includes an integrated arrangement for producing hydrogen gas. The arrangement has a reaction chamber for producing $H_2$ gas by reaction of water with a hydride; and a fuel cell stack having an $H_2$ gas is transferred. Each fuel cell has an opening which together form the distribution channel and by means of which an $H_2$ gas distribution in individual fuel cells is provided. The reaction chamber is situated underneath, and a water coupling is situated above the cell stack. Further a tension rod having a longitudinal internal passage connecting the water coupling with the reaction chamber is disposed in the openings for holding together the fuel cells. A valve is connected to the tension rod for controlling the passage.

14 Claims, 6 Drawing Sheets

DEVICE FOR CONVERTING ENERGY USING FUEL CELLS WITH INTEGRATED HYDROGEN GAS PRODUCTION

BACKGROUND OF THE INVENTION

The invention relates to a device for converting energy using fuel cells with a proton-hydrogen electrolyte and an integrated device for hydrogen gas production and, further the invention relates precharacterizing, to a method of producing hydrogen gas ($H_2$ gas) with a means which is integrated into such a device for converting energy using fuel cells, the $H_2$ gas being used as a combustion gas for the fuel cells.

Fuel cells can be used for converting hydrogen ($H_2$) directly into electric current by reacting with oxygen ($O_2$). The use of such fuel cells thus depends on the availability of $H_2$ gas. Fuel cells with a proton-conducting electrolyte are therefore supplied with stored $H_2$. This gaseous fuel can either be adsorbed in metal hydrides at room temperature under pressure (for example 200 bar), at temperatures around −150° C., or be stored in liquid form at −255° C. All three possible types of storage are laborious, expensive, complicated in terms of handling and require the use of heavy, voluminous containers. Furthermore, $H_2$ is always also potentially hazardous, since it is very reactive and may explode.

As known, for example from EP 206 608, EP 404 712, EP 729 196 or U.S. Pat. No. 4,642,272, $H_2$ can be produced chemically from hydrocarbons (methane, methanol, benzene etc.). Water vapor is admixed to the fuel at an elevated temperature in catalytic converters, the hydrocarbon molecules being converted into $H_2$ and carbon monoxide (CO). In a second reaction stage, the CO then reacts, when water vapor is added, to give carbon dioxide ($CO_2$). This again causes $H_2$ to be produced. In a third stage, CO and $CO_2$ must be carefully separated from the $H_2$, in order to avoid "poisoning" the platinum electrodes of the fuel cell. This way of producing $H_2$ is laborious, cost-intensive and efficiency-reducing. The reforming i.e. the conversion of hydrocarbons into $H_2$, may be integrated in the fuel cell or connect to the latter.

DE 27 28 109 and GB 1,568,374 also disclose methods in which the $H_2$ adsorbed on metals or metal compounds is released by heating. For this purpose, lithium borohydride is used in DE 27 28 109 and magnesium hydride is used in GB 1,568,374, the lithium borohydride and magnesium hydride being respectively charged with $H_2$ in advance. This interesting form of $H_2$ storage or $H_2$ production consequently concerns the reversal of a physical effect which is bound to specific thermodynamic conditions.

For use with alkaline fuel cells, there has also been proposed (U.S. Pat. No. 3,511,710) a method in which the $H_2$ contained in borohydride is oxidized at the anode directly with $O_2$ to give water.

Under certain conditions, such as for example by the use of water solution containing sodium chloride (for example sea water; CA 2,079,925), magnesium can be chemically converted with water to give magnesium hydroxide, with the release of $H_2$. However, this conversion requires the presence of catalysts such as cobalt, zinc etc. and, in particular, chlorine, which neutralizes the internal electric voltages which build up in the material during the reaction with water.

For the operation of relatively small fuel cells, used for example in the leisure sector on camping sites, in caravans or on sailing boats, in the training sector for demonstration purposes, in the military sector or on expeditions, the previously mentioned possibilities for producing or supplying $H_2$ are not practicable.

EP 0 813 264 discloses a portable fuel cell arrangement for the conversion of liquid or gaseous hydrocarbons into electric DC current. Fuel cells of the solid-polymer type and a sealing container in which hydrogen gas for supplying the fuel cells is released from chemical compounds are disclosed. A hydrogen line, into which a valve or a hydrogen-flow and/or hydrogen-pressure control are fitted, connects the container to the fuel cells in a removable manner.

WO 98/35398 likewise discloses a portable fuel cell arrangement for the conversion of liquid or gaseous hydrocarbons into electric DC current. This fuel cell arrangement comprises disc-shaped, preferably circular, fuel cells for axial arrangement in layers in a stack, which is fixed by a tension rod. The fuel cell has for receiving the tension rod and for letting in a first gas a preferably central opening and is characterized by a special form of the gas line which permits a uniform distribution of the reaction at the anode and consequently a uniform current distribution in the plane of a fuel cell or a high average power per unit area. However, no solution for producing a fuel gas is proposed here.

SUMMARY OF THE INVENTION

The object of the invention is to propose alternative means and methods which permit hydrogen gas to be produced for portable fuel cells in a simple way.

According to the invention, the object is achieved according to a first aspect by proposing a device which, for converting energy using fuel cells, is equipped with a proton-conducting electrolyte and with integrated hydrogen gas production, which comprises a reaction chamber in which there is produced—by reacting water with one or more hydrides—$H_2$ gas, which can be transferred into an $H_2$ distribution channel of a fuel cell stack, and which is characterized in that the fuel cells each have an opening, which openings form the $H_2$ distribution channel and via which the $H_2$ gas distribution into the individual fuel cells is provided, and in that a tension rod is arranged in the opening—for holding together the fuel cells in the fuel cell stack.

According to a second aspect, the object is achieved by proposing a method of producing hydrogen gas ($H_2$ gas) in a device for converting energy using fuel cells with a proton-conducting electrolyte and with integrated hydrogen gas production, which comprises a reaction chamber in which there is produced—by reacting water with one or more hydrides—$H_2$ gas, which is transferred into an $H_2$ distribution channel of a fuel cell stack and is used as a combustion gas for the fuel cells, which is characterized in that the fuel cells each have an opening, which openings form the $H_2$ distribution channel and via which the $H_2$ gas distribution into the individual fuel cells is provided, a tension rod being arranged in the openings—for holding together the fuel cells in the fuel cell stack.

The production of $H_2$ gas is based on a chemical reaction known per se, in which hydrides are converted with water to give hydroxides. The $H_2$ released in the process can react in the downstream fuel cell with $O_2$, preferably in the form of atmospheric oxygen, resulting in the production of DC current.

Preferred embodiments of the invention are represented in the drawings, which are to be understood as exemplary, schematic representations and are not intended to restrict the extent of the invention in any way.

DESCRIPTION OF THE PREFERRED EMBODIMENTS

Figure 1:
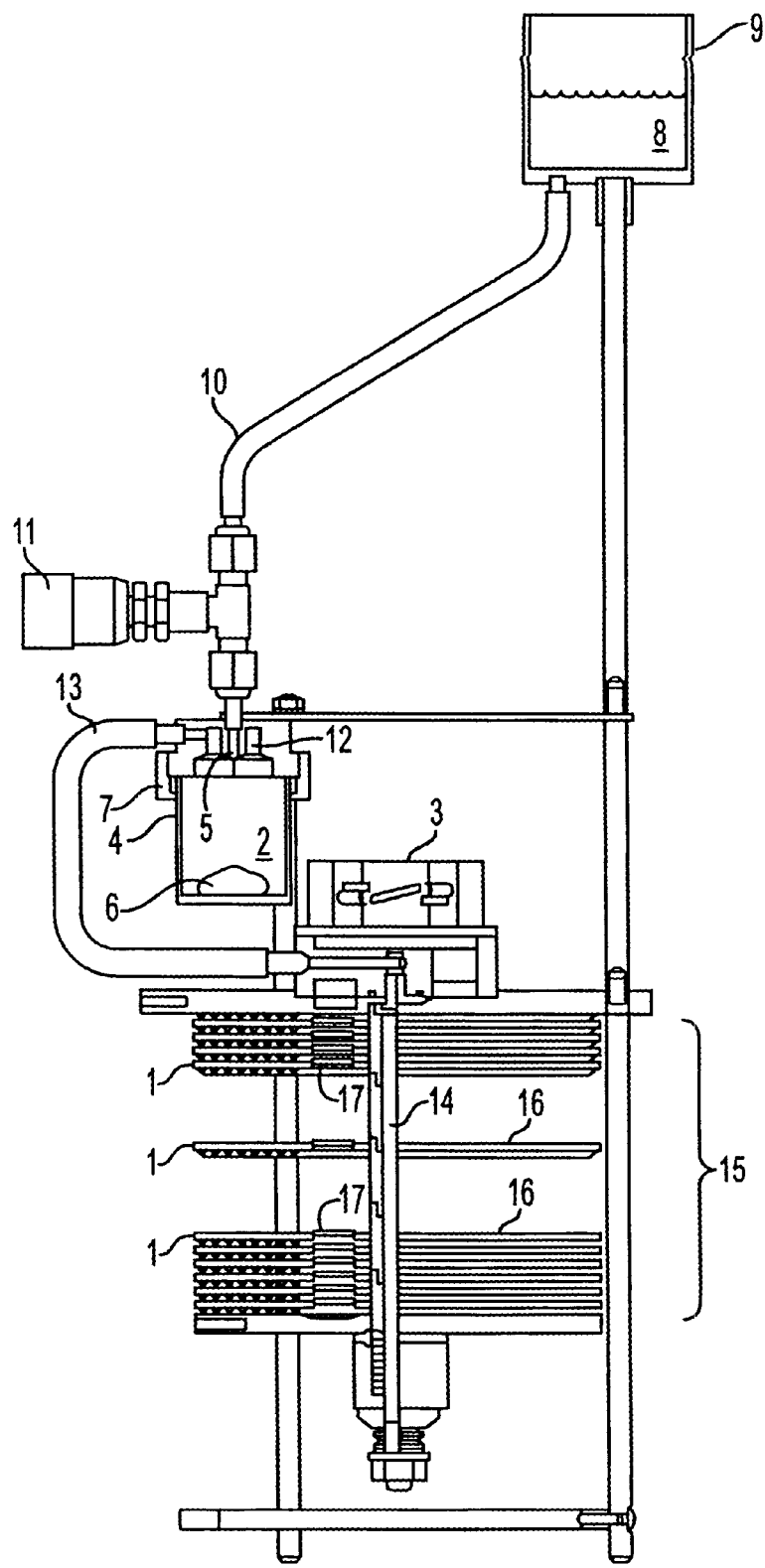
FIG. 1 shows a cross section through a device for converting energy using fuel cells, according to a first embodiment, with an integrated reaction chamber and ventilator.

A preferred first embodiment is represented in FIG. 1 This embodiment of the invention allows fully autonomous operation of the fuel cells 1—i.e. independently of the $H_2$ reservoirs mentioned in the prior art and also of an external energy supply. It comprises an integrated reaction chamber 2 and a fan blower 3, which is integrated in the system and is connected to the electrical output of the fuel cell in such a way that it begins to work automatically as a conveying means for the air when the $H_2$ produced in the reaction chamber 2 reaches the cells 1. The blower 3 thus preferably only operates when current is also actually being produced by the conversion of $H_2$ and $O_2$ into water, for which reason there is no need for a switch or even a control for this ventilator or blower.

The method of producing the gaseous $H_2$ for the operation of the fuel cells 1 in a fuel cell stack 15 comprises the following steps:

1. The container 4 of the reaction chamber 2 is separated from the cover 5 of the same.
2. An amount of hydrides 6, for example lithium hydride (LiH), potassium hydride (KH), sodium hydride (NaH) or calcium hydride ($CaH_2$), or mixtures of hydrides, corresponding to the intended duration of the production of current is filled into the container 4 in solid form.
3. The container is connected again to the cover 5 of the reaction chamber 2, which preferably takes place by means of shutting-off means 7, which comprise for example a union nut and suitable seals.
4. Water 8, which is stored in a reservoir 9, is then let into the reaction chamber 2 via a feed line 10 and an inlet valve 11, connected upstream of the reaction chamber 2 and opened for this purpose.
5. The water ($H_2O$) then reacts spontaneously, according to the exemplary formula $$CaH_2+2H_2O=Ca(OH)_2+2H_2,$$

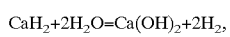

with calcium hydride or other hydrides present.
6. The $H_2$ gas produced passes from the reaction chamber 2 via an outlet nozzle 12 and a feed line 13 into the $H_2$ distribution channel 14 of the fuel cell stack 15.
7. At the fuel cell electrodes 16 of the fuel cells 1 the $H_2$ is then disassociated and ionized by the release of electrons. The positively charged hydrogen ions (=protons) migrate through the electrolyte to the cathode, where they spontaneously react with the oxygen present in the ambient air, with the acceptance of electrons. An electric voltage is produced between the terminals of the fuel cell stack 15.
8. Part of the electric potential produced is required to keep the ventilator 3 or the fan blower connected to the electric terminals operating. However, the forced ventilation taking place as a result (from top to bottom or in the reverse direction) of the air feed channels 17 improves the supply of atmospheric oxygen to the fuel cell stack 15 and consequently increases the electric potential of the fuel cells 1.
9. The production of current continues as long as the reaction mentioned under 5 proceeds and new hydrogen is continuously fed to the fuel cells 1.

Figure 2:
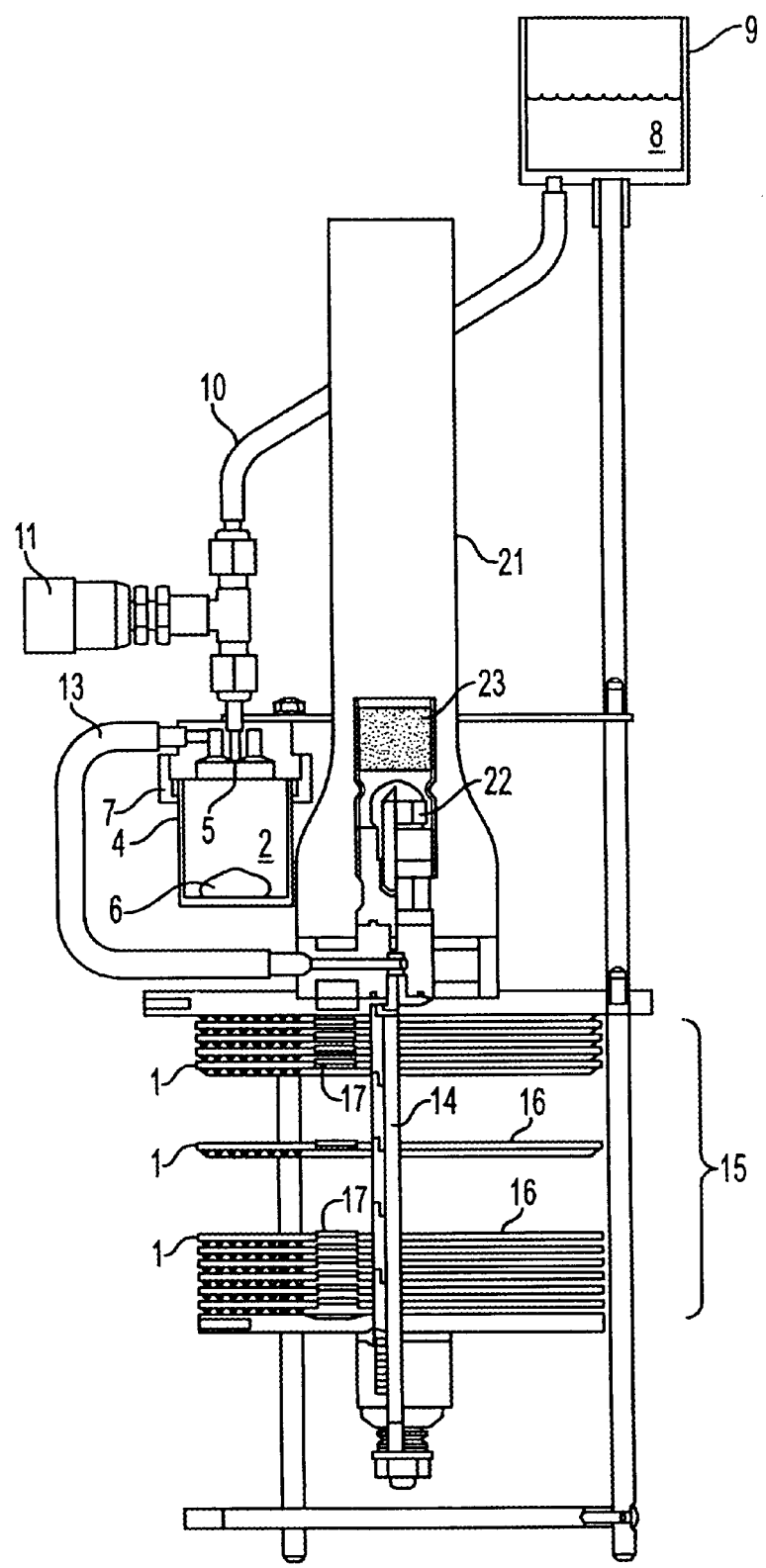
FIG. 2 shows a cross section through a device for converting energy using fuel cells, according to a second embodiment, with an integrated reaction chamber and flue.

A preferred, second embodiment is represented in FIG. 2. This embodiment of the invention likewise allows fully autonomous operation of the fuel cells 1—i.e. independently of the $H_2$ reservoirs mentioned in the prior art. Unlike the first embodiment, it comprises a flue 21, which moreover may have a burner 22. These are positioned at one end of an $H_2$ distribution channel 14 in such a way that part of the hydrogen ($H_2$) obtained from the reaction of water with hydrides can be used as a combustion gas for the burner 22. Preferably serving as the igniting means for the burner is a ceramic wool 23, which is coated with platinum and consequently has a catalytic effect and thanks to which the burner 22 is ignited automatically when $H_2$ flows through. Unlike the blower 3, which can produce a positive pressure or suction, the flue 21 only produces suction, thanks to which the atmospheric oxygen is transported from the periphery of the fuel cells into the fuel cells, along the cathodes and upwards through the suction-removal line 17. The burner 22 only operates when $H_2$ is actually also being delivered. There is likewise no need for a switch or a control for this burner. There is also the possibility of operating the flue 21 without the burner 22 by merely using the warm exhaust air of the fuel cells 1 and the associated thermal uplift. The relative negative pressure produced in the process on the exhaust-air side of the fuel cells has the effect that fresh atmospheric oxygen is sucked in on the feed-air side of the fuel cells.

Figure 3:
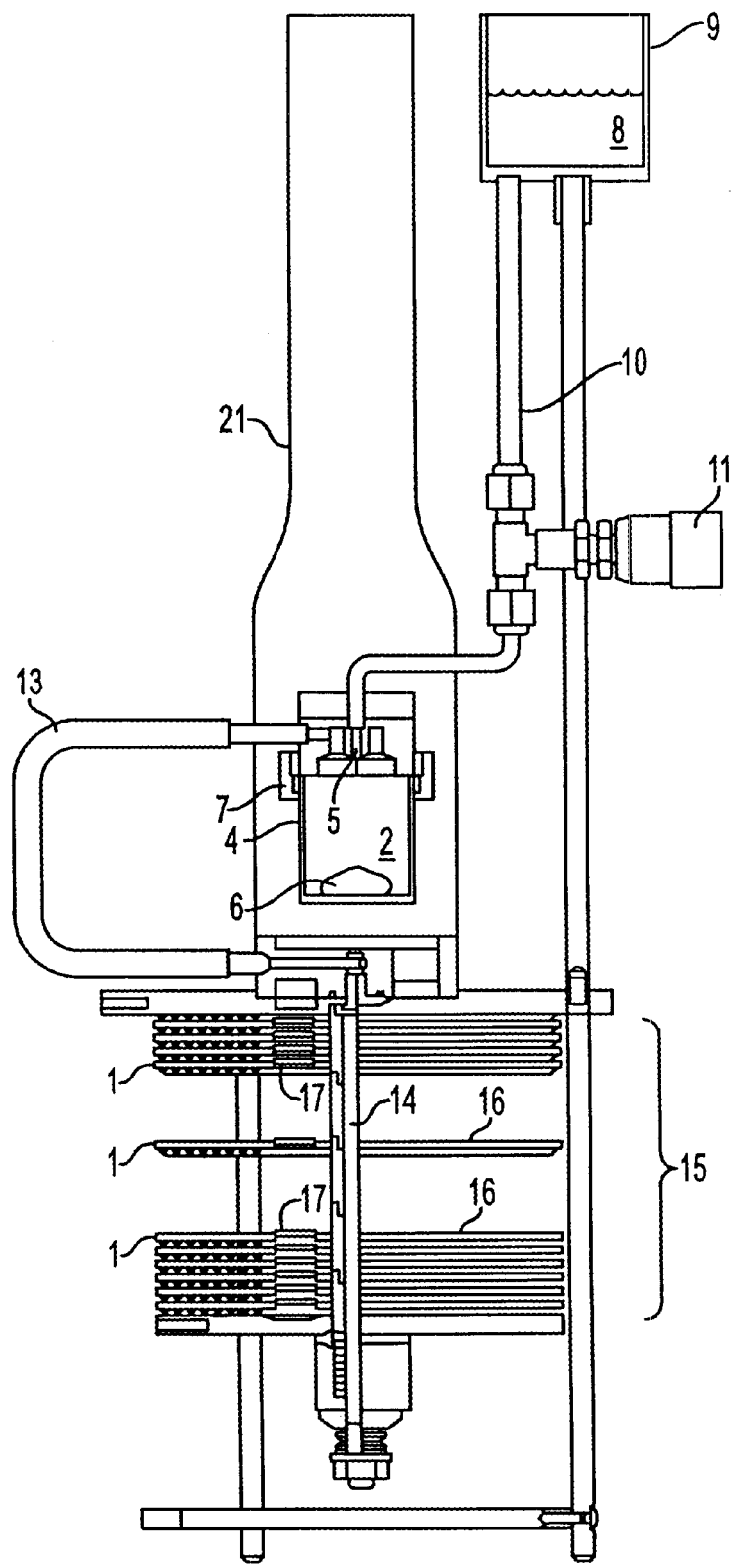
FIG. 3 shows a cross section through a device for converting energy using fuel cells, according to a third embodiment, with a reaction chamber integrated in the flue.

A preferred third embodiment of the invention is represented in FIG. 3. In a way corresponding to the second embodiment, this device for converting energy using fuel cells likewise has a flue 21; the reference numerals have been entered in a way corresponding to those in FIG. 2. Unlike the second embodiment, here the reaction chamber 2 is integrated in the flue 21, in order to use the heat of reaction occurring during hydrogen production for improving the suction effect. The air flow through the fuel cell stack 15 is improved in comparison with an embodiment without a burner 22 in the flue 21.

Figure 4:
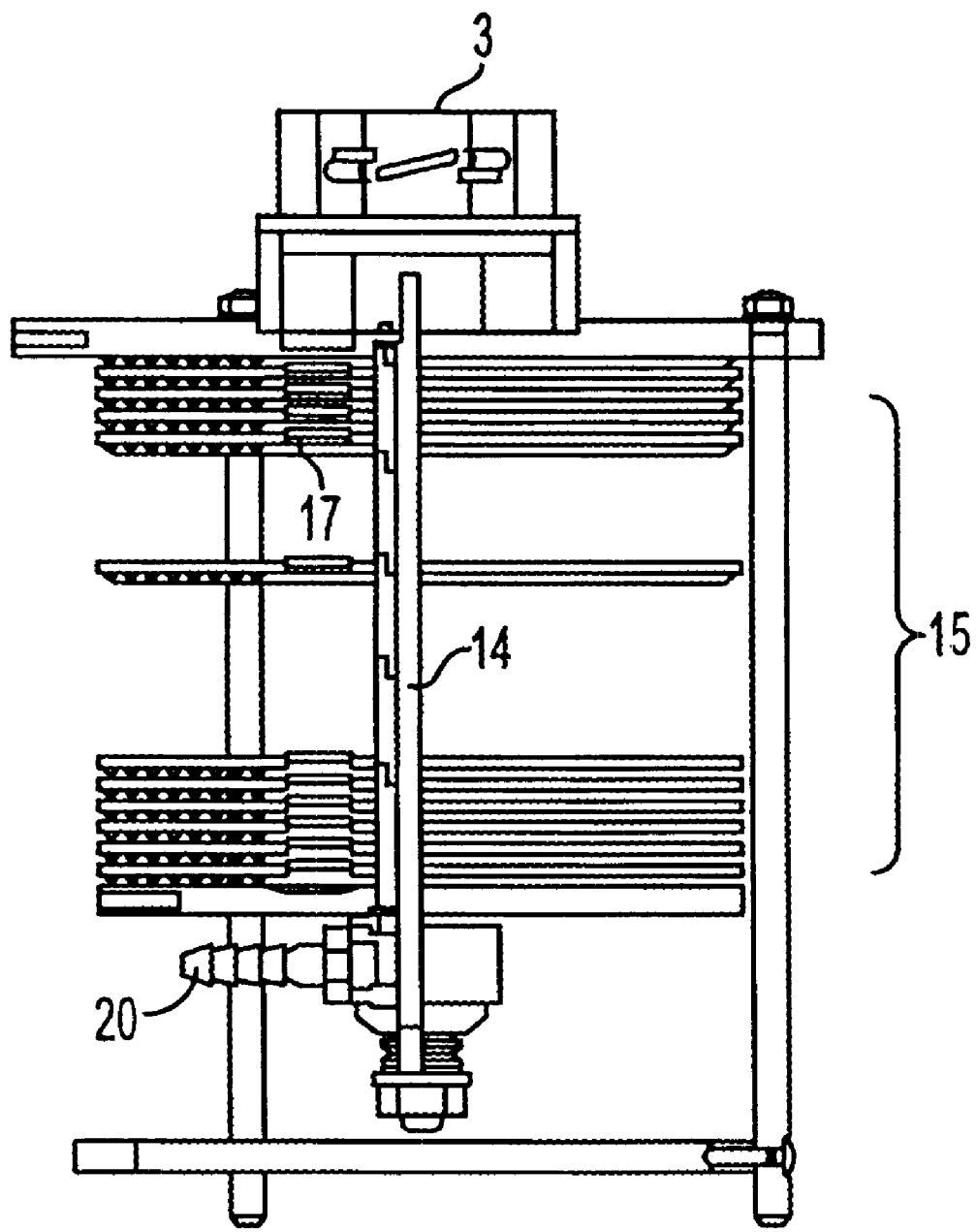
FIG. 4 shows a cross section through a device for converting energy using fuel cells, according to a fourth embodiment, with an external $H_2$ gas supply and ventilator.

A fourth embodiment of the invention is represented in FIG. 4. In a way corresponding to the first embodiment, this device for converting energy has a ventilator 3 for improving the flow of atmospheric oxygen through the fuel cell stack 15. Unlike the first embodiment, here the fuel cell stack is supplied with externally produced or externally stored $H_2$ gas via the nozzle 20.

Figure 5:
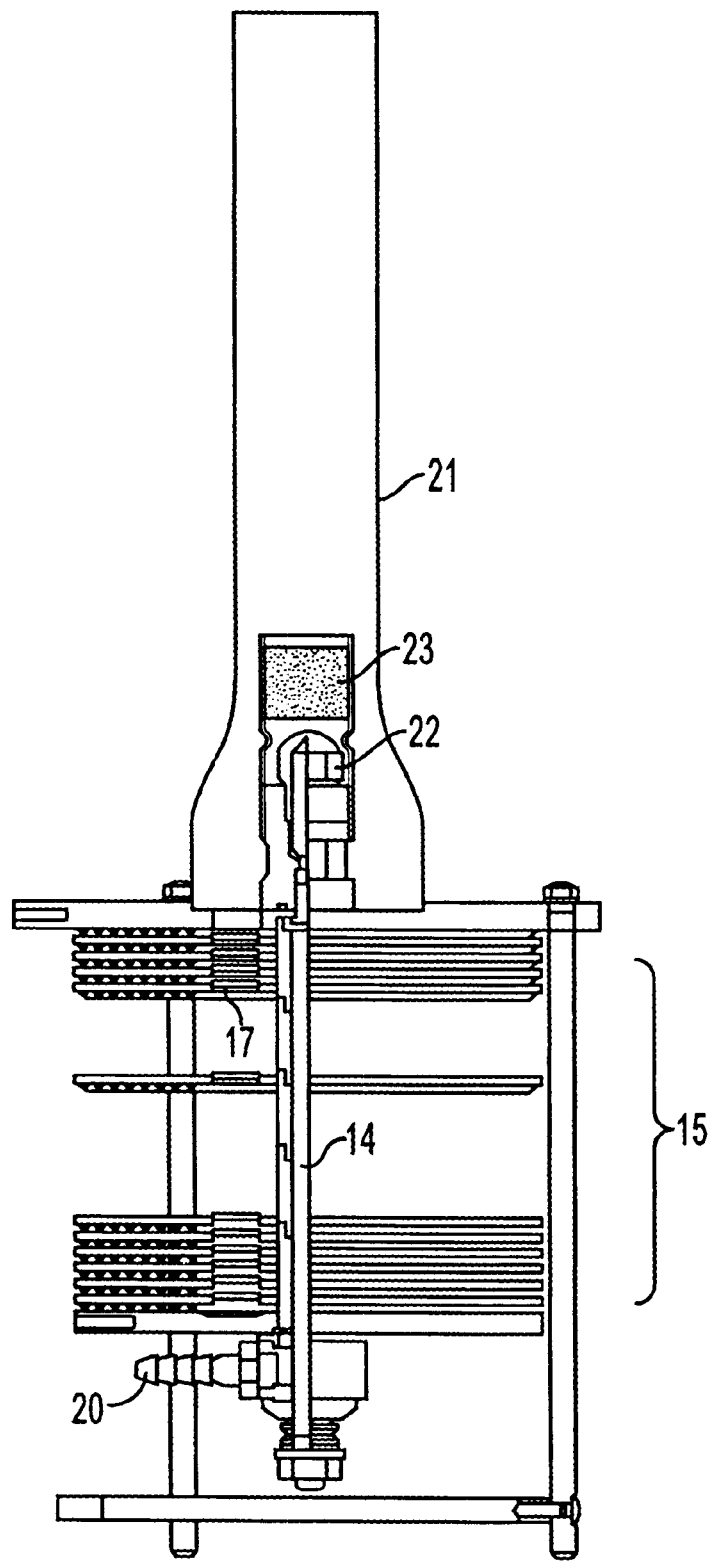
FIG. 5 shows a cross section through a device for converting energy using fuel cells, according to a fifth embodiment, with an external $H_2$ gas supply and flue.

A fifth embodiment of the invention is represented in FIG. 5. In a way corresponding to the second embodiment, this device for converting energy has a flue 21 for improving the flow of atmospheric oxygen through the fuel cell stack 15. Here too, the flue 21 may optionally be equipped with a burner 22 or be without a burner 22. Unlike the second embodiment, here the fuel cell stack is supplied with externally produced or externally stored $H_2$ gas via the nozzle 20.

It is clear from FIGS. 4 and 5 that the means for improving the oxygen circulation in the fuel cell stack 15 can if need be also be used for fuel cell stacks without integrated $H_2$ gas production.

Figure 6:
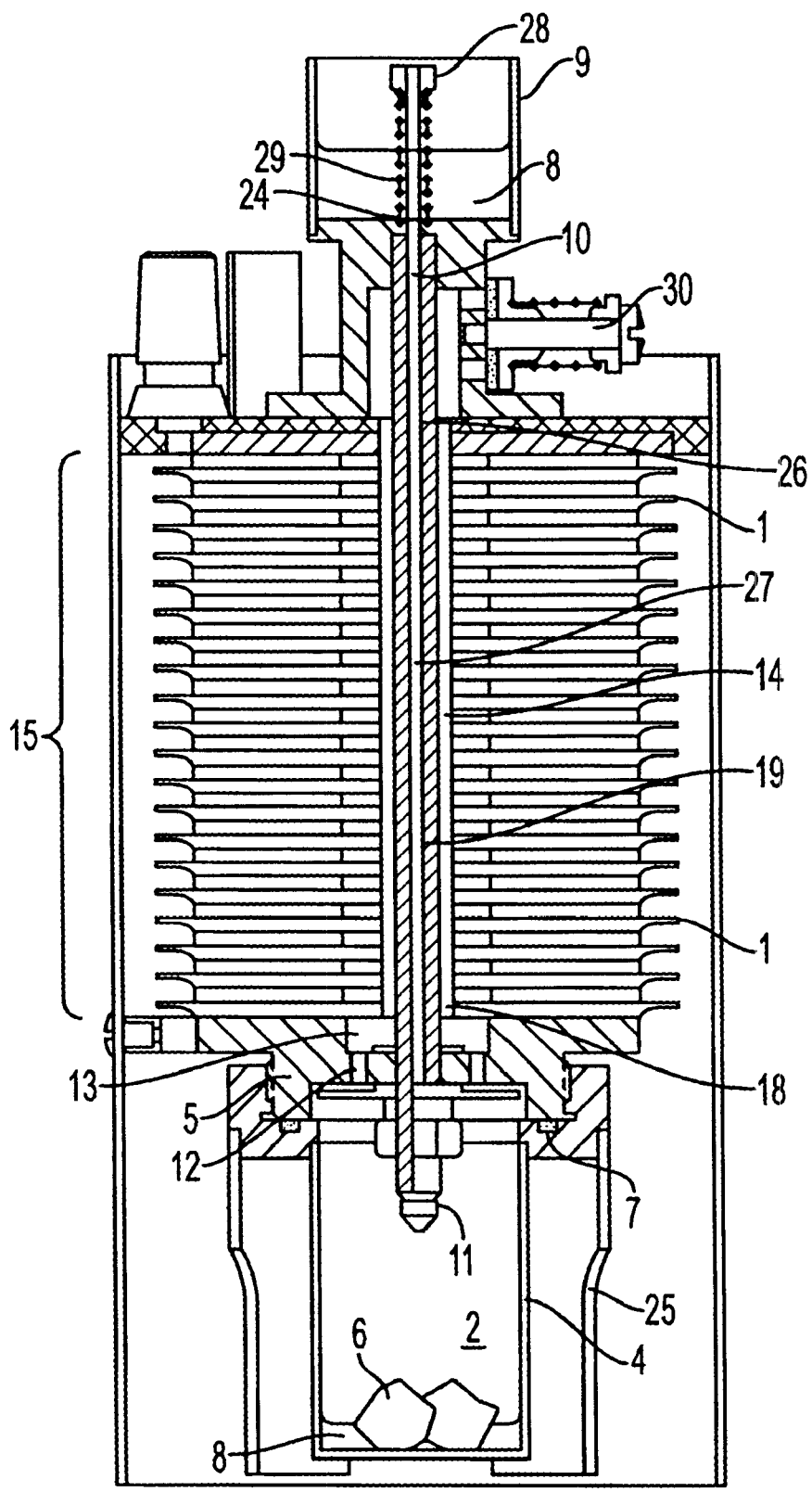
FIG. 6 shows a cross section through a device for converting energy using fuel cells, according to a sixth embodiment, with an integrated reaction chamber lying at the bottom.

FIG. 6 shows a cross section through a device for converting energy using fuel cells, according to a particularly preferred, sixth embodiment. This embodiment of the invention likewise allows fully autonomous operation of the fuel cells 1—i.e. independently of the $H_2$ reservoirs mentioned in the prior art and also of an external energy supply. It comprises an integrated reaction chamber 2, which is arranged underneath the fuel cell stack 15 and in which there is produced—by reacting water 8 with one or more hydrides 6—$H_2$ gas, which can be transferred into an $H_2$ distribution channel 14 of a fuel cell stack 15. The fuel cells 1 each have an opening 18, which openings form the $H_2$ distribution channel 14 and via which the $H_2$ gas distribution into the individual fuel cells 1 takes place. Arranged in the openings 18 is a tension rod 19—for holding together the fuel cells 1 in the fuel cell stack 15. The fuel cells 1 are of a circular design and the openings 18 and the tension rod 19 are arranged at their center. The fuel cells 1 may also be of a polygonal shape, such as rectangular, square or hexagonal, resulting in a virtually loss-free blank for the polymer membranes. Underneath the fuel cell stack 15 there is the reaction chamber 2 and above the fuel cell stack 15 there is a water connection 24 which comprises a reservoir 9. The water connection 24, could, however, also be designed as a hose connection, for example with a quick-action closure. The central tension rod 19 connects the water connection 24 to the reaction chamber 2 via a hollow space 26. This hollow space 26 of the tension rod opens out at its upper end into the reservoir 9 and at its lower end into the reaction chamber 2. While the upper end of the hollow space 26 always remains open, its lower end can be closed by an inlet valve 11. The inlet valve 11 can be opened using an actuating rod 27, by means of pressure applied by a finger on its upper end 28. The provision of a closing spring 29 has the effect that the inlet valve 11 is of a self-closing design. When there is negative pressure in the reaction chamber 2, which may be produced by the consumption of hydrogen, the valve 11 opens, preferably automatically, as soon as the force produced by the negative pressure exceeds the closing force of the closing spring 29. This results in an automatic, controlled feeding of water into the reaction chamber 2, with the result that an automatic control of the production of current is achieved. If, on the other hand, excessive positive pressure is produced in the reaction chamber 2, a safety or pressure-relief valve 30 briefly opens until the force exerted by the positive pressure in the reaction chamber 2 on the safety valve 30 is less than its closing force. An actuating ring 25 surrounds the reaction chamber 2 which, preferably like the fuel cell stack as well, is of a cylindrical shape. The actuating ring 25 is preferably thermally insulated with respect to the reaction chamber. Thus—if appropriate after opening of the pressure-relief valve 30—the reaction chamber heated by the operation of the device for converting energy, i.e. by reacting the water with the hydride or the hydride mixture, can be opened and closed again safely.

The method of producing the gaseous $H_2$ for the operation of the fuel cells 1 in a fuel cell stack 15 comprises the corresponding steps as already mentioned with respect to FIG. 1. Unlike FIG. 1, the central tension rod 19, which is of a hollow design serves as a water feed line 10 to the reaction chamber 2 and the $H_2$ gas produced passes from the reaction chamber 2 via an outlet 12 and an annular feed line 13 into the $H_2$ distribution channel 14 of the fuel cell stack 15.

As a departure from the situation represented in FIG. 1 or in FIG. 6, the reservoir 9 (here represented only partially closed) may also comprise a completely closable space. Moreover, the letting in of the water 8 into the reaction chamber 2 may take place in such a way that precisely the required amount of water for the amount of electric current desired at the given time is let in by means of the valve 11. Mixtures of two or more hydrides, for example $CaH_2$/NaH, or of hydrides and other substances reacting with $H_2O$ with the release of $H_2$ gas may also be used. In the reaction of calcium hydride with water, heat is produced (exothermic reaction). Other hydrides, on the other hand, react with water only endothermically, i.e. heat must be provided for this reaction A suitable mixing ratio of the hydrides used allows the heat of reaction of $CaH_2$ and $H_2O$ to be used for cleaving the admixed hydrides and thus achieving a thermally neutral conversion.

If FIGS. 1 to 3 are compared with one another, it can be established that the device according to the invention for converting energy with integrated $H_2$ gas production and the central $H_2$ distribution channel 14 can be converted without great expenditure from operation with a ventilator 3 and atmospheric oxygen supply by means of negative or positive pressure to operation with a flue 21 (with or without burner 22 or integrated reaction chamber 2) and an atmospheric oxygen supply by means of negative pressure. In the case of the second embodiment, the waste heat of the reaction chamber 2 is used for producing or intensifying the flue effect. This permits the optional use of fuel cell stacks of otherwise the same construction for all three modes of operation.

The invention includes fuel cell stacks 15 with a proton-conducting electrolyte as well as an integrated device for producing hydrogen gas, as it is characterized in claims 1 to 6. The $H_2$ gas is produced in a reaction chamber 2, integrated in the fuel cell stack 15, by reacting water 8 with one or more hydrides 6, in particular lithium hydride (LiH), potassium hydride (KH), sodium hydride (NaH) or calcium hydride ($CaH_2$), and can be transferred by means of suitable lines into the $H_2$ distribution channel 14 of a fuel cell stack 15. Shut-off and/or metering valves may be integrated in these lines for setting or controlling the $H_2$ gas flow.

The integration of the $H_2$ gas production by means of installing or connecting the reforming chamber 2 described into the device for converting energy as well as the use of atmospheric oxygen for the production of the electrical energy at the proton-conducting electrolyte of the individual fuel cells 1 have made it possible to produce fuel cells which can be operated fully autonomously, i.e. independently with respect to $H_2$ gas sources or reservoirs and any form of external energy. These fuel cell stacks with integrated $H_2$ gas production can in this case be of such a compact construction that they can be used as portable suppliers of electrical energy on hikes, in the expedition, military, camping or training sector or as easy-to-install energy converters, for example in caravans or on sailing boats.

For example, the entire device for converting energy using fuel cells (1) with a proton-conducting electrolyte and with integrated hydrogen gas production can be installed in a cylindrical sheet-metal or plastic container which can also be carried with one hand.

What is claimed is:

1. In a device for converting energy by means of a proton-conducting electrolyte, including integrated means for producing hydrogen gas; said means including a reaction chamber for producing $H_2$ gas by reaction of water with at least one hydride; and a fuel cell stack formed of a plurality of fuel cells and having an $H_2$ distribution channel into which the $H_2$ gas is adapted to be transferred, the improvement wherein each said fuel cell has an opening which together form said $H_2$ distribution channel and by means of which an $H_2$ gas distribution in individual said fuel cells is provided; said reaction chamber being situated underneath said fuel cell stack;

the improvement further comprising (a) a water coupling situated above said fuel cell stack;

(b) a tension rod having a longitudinal internal passage connecting said water coupling with said reaction chamber; said tension rod being disposed in said openings for holding together said fuel cells as said fuel cell stack; and (c) a valve connected to said tension rod for controlling said passage.

2. The device as defined in claim 1, wherein said fuel cells are one of circular, rectangular, square and hexagonal shape and further wherein said openings and said tension rod are disposed in a center of said fuel cells.

3. The device as defined in claim 1, further comprising conveying means for enhancing a flow of an air stream through the fuel cell stack.

4. The device as defined in claim 3, wherein said conveying means comprises a blower.

5. The device as defined in claim 3, wherein said conveying means comprises a flue.

6. The device as defined in claim 5, further comprising a burner disposed in said flue.

7. The device as defined in claim 5, wherein said reaction chamber is disposed in said flue.

8. A method of producing $H_2$ gas in a device for converting energy by means of a proton-conducting electrolyte, comprising the following steps:

(a) producing $H_2$ gas in a reaction chamber by a reaction between water and at least one hydride;

(b) introducing the $H_2$ gas into an $H_2$ distributing channel of a fuel cell stack for use as a fuel for the fuel cells of the fuel cell stack;

(c) distributing the $H_2$ gas to the individual fuel cells through openings provided in the fuel cells and together constituting the $H_2$ distributing channel; and (d) admitting water to the reaction chamber by opening a valve in response to a negative pressure in the reaction chamber.

9. The method as defined in claim 8, wherein said at least one hydride is selected from the group consisting of LiH, KH, NaH, and $CaH_2$.

10. The method as defined in claim 9, further comprising the step of performing step (a) with a mixture of at least two of the hydrides of said group.

11. The method as defined in claim 8, further comprising the step of generating an air flow through the fuel cells by a ventilator.

12. The method as defined in claim 8, further comprising the step of generating an air flow through the fuel cells by a flue.

13. The method as defined in claim 12, further comprising the step of heating the air by a burner.

14. The method as defined in claim 12, further comprising the step of enhancing a suction effect of said flue by heat released in performing step (a).

* * * * *